United States Patent [19]
Klein

[11] Patent Number: 5,857,084
[45] Date of Patent: Jan. 5, 1999

[54] HIERARCHICAL BUS STRUCTURE ACCESS SYSTEM

[76] Inventor: Dean A. Klein, 1113 W. Marion St., Lake City, Minn. 55041

[21] Appl. No.: 725,019

[22] Filed: Oct. 2, 1996

Related U.S. Application Data

[63] Continuation of Ser. No. 146,793, Nov. 2, 1993, abandoned.

[51] Int. Cl.$^6$ .................................................. G06F 13/00
[52] U.S. Cl. ............................................................ 395/309
[58] Field of Search ............................ 395/309, 200.05, 395/200.15, 200.16; 370/402, 408

[56] References Cited

U.S. PATENT DOCUMENTS

| | | | |
|---|---|---|---|
| 4,466,060 | 8/1984 | Riddle | 395/200.15 |
| 4,783,730 | 11/1988 | Fischer | 395/825 |
| 5,018,133 | 5/1991 | Tsukakoshi et al. | 370/16 |
| 5,081,576 | 1/1992 | Ward | 395/325 |
| 5,136,580 | 8/1992 | Videlock et al. | 370/60 |
| 5,239,632 | 8/1993 | Larner | 395/306 |
| 5,243,700 | 9/1993 | Larson et al. | 395/822 |
| 5,257,391 | 10/1993 | DuLac et al. | 395/800 |
| 5,274,783 | 12/1993 | House et al. | 395/325 |
| 5,280,480 | 1/1994 | Pitt et al. | 370/85.13 |
| 5,303,352 | 4/1994 | Robinson et al. | 395/325 |
| 5,329,527 | 7/1994 | Ujihashi et al. | 370/85.13 |
| 5,343,471 | 8/1994 | Cassagnol | 370/85.13 |
| 5,454,092 | 9/1995 | Sibigtroth | 395/412 |
| 5,583,996 | 12/1996 | Tsuchiya | 395/200.15 |
| 5,630,184 | 5/1997 | Roper et al. | 395/200.1 |

OTHER PUBLICATIONS

Peripheral Component Interconnect (PCI), Revision 1.0 Specification by Intel., Jun. 22, 1992.

VESA VL–Bus™ Preliminary Specification/VL–Bus™ Interface Architecture, Timing and Physical Specifications by Video Electronics Standards Association, Revision: 0.8; Dated Jun. 6, 1992.

*Primary Examiner*—Jack B. Harvey
*Assistant Examiner*—Paul R. Myers

[57] ABSTRACT

A system and method for reducing the time required to access peripheral devices or to perform peripheral device operations in a multiple bus architecture or hierarchical bus structure environment. A memory device is used to remember which addresses generated responses on which busses. The memory device is accessed in subsequent operations to eliminate the procedure for determining which bus is attached to the desired peripheral.

10 Claims, 7 Drawing Sheets

| BIT 1 | BIT 0 | BUS ASSOCIATION |
|---|---|---|
| 0 | 0 | BUS DELTA (VALID) |
| 0 | 1 | BUS BETA (VALID) |
| 1 | 0 | BUS ALPHA (VALID) |
| 1 | 1 | INVALID |

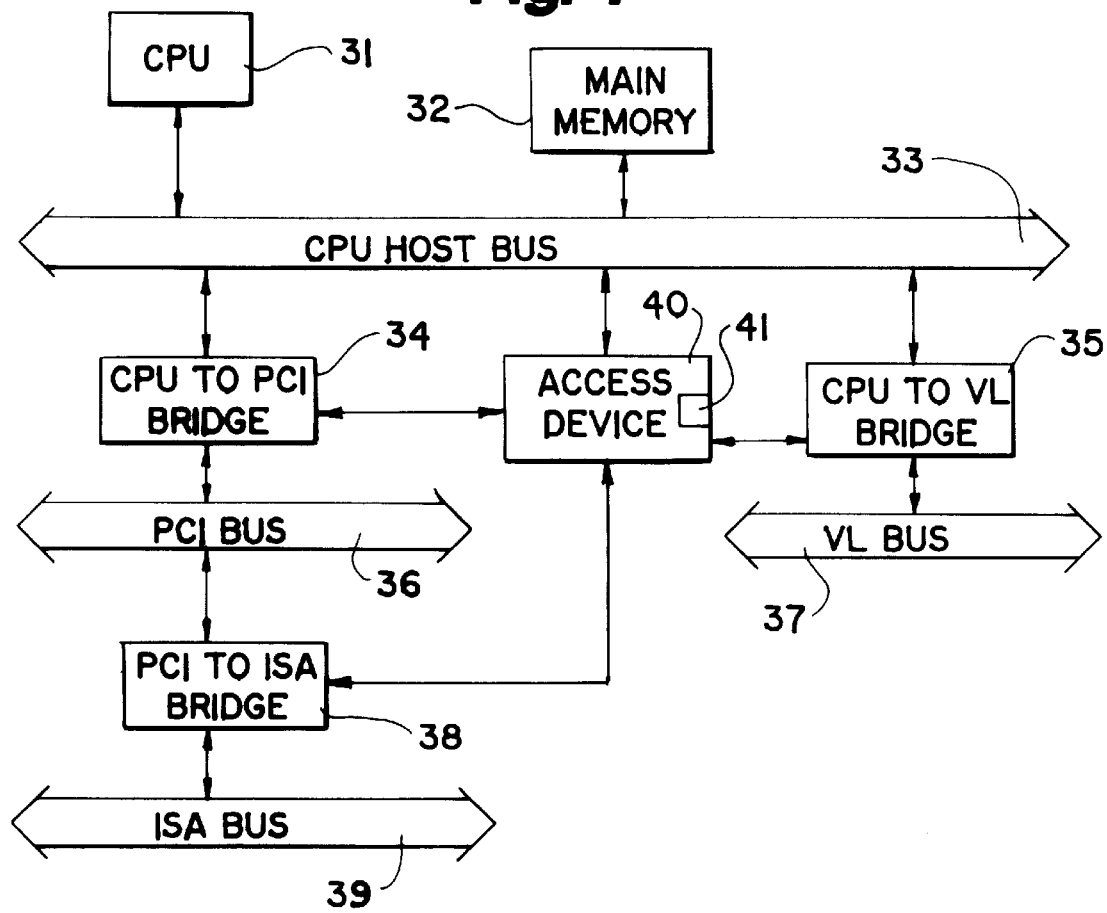

Fig. 10

- 4GB — FFFFFFFF HEX
- ROM BIOS
- 256MB
- DRAM
- 1MB — FFFFF HEX
- BIOS ROM — F0000
- — E0000
- — D0000
- VIDEO 201 — C0000
- — B0000
- — A0000
- — 90000
- — 80000
- — 70000
- — 60000
- DRAM — 50000
- — 40000
- — 30000
- — 20000
- — 10000
- — 00000 HEX

HIERARCHICAL BUS STRUCTURE ACCESS SYSTEM

This is a continuation of application Ser. No. 08/146,793 filed Nov. 2, 1993, now abandoned.

BACKGROUND OF THE INVENTION

1. Field of the Invention

The present invention relates to a system for improving processing performance in a computer employing two or more bus architectures or employing a hierarchical bus structure.

2. Description of Prior Art

Over the past ten years, advances in microprocessor technology have enabled personal computers to achieve increasingly higher levels of performance. Software applications have also become much more complex and sophisticated during this same time period. Today's software involves sophisticated graphics, on-line transaction processing, local-area networking and real-time video. These relatively new applications require vast amounts of data to be processed and moved faster than ever before between a microcomputer computer's central processing unit (CPU) and peripheral units. The industry-standard 16-bit/8-MHz ISA (Industry Standard Architecture) expansion bus—the decade-old bus found in most computers today—cannot adequately transport the large amounts of data generated by these applications. The ISA expansion bus, introduced in 1984 by IBM, forces today's high-performance 32-bit microprocessors to wait as hard disks, video boards and other peripherals send and receive data along a path that is narrow, slow, and inefficient. Consequently, serious bottlenecks occur in modern microprocessor-based systems, operating at 66 MHz and faster, as applications using large files vie for the precious limited bandwidth offered by the ISA system bus.

Enhanced bus standards that have been introduced in an attempt to replace ISA, such as Extended Industry Standard Architecture (EISA) and Micro Channel Architecture (MCA), improve data throughput and provide capability for short bursts as fast as 33 MBps with EISA and potentially faster with MCA. But limited availability, design complexity, and high production costs have relegated these solutions to servers and specialized systems.

Today's solution to the bottleneck problem is generally acknowledged to be an innovation called the local bus. The bus is "local" in the sense that it brings peripheral functions closer to the microprocessor. The CPU bus provides a high speed data path that traditionally has been reserved for the CPU, cache and main memory subsystem. The expansion bus, by comparison, provides the lower speed data path and physical connection between all peripherals and the CPU bus. With the addition of a local bus, peripherals that require rapid transfers of large amounts of data are put in close connection with the CPU and memory subsystem. This arrangement allows high-performance peripherals such as video cards, network adapters and disk controllers to bypass the I/O bottlenecks of traditional system buses and take a short cut to the CPU. In a 486 DX2-66 CPU-based system, for example, the local bus is 32 bits wide and runs at 33 MHz for bus throughput as fast as 132 MBps.

Not all peripherals require high data transfer rates in order to perform up to their potential. Lower-bandwidth peripherals such as FAX/modems, tape drives and printers are still well served by the standard ISA expansion bus. Because of this, local bus systems are usually designed in conjunction with an ISA expansion bus. In a typical local bus implementation, the ISA expansion bus controller feeds into the local bus as though it were another peripheral, providing the interface for lower performance add-in cards that are configured within the system. Computing systems therefore often involve multiple bus architectures and a bus hierarchy. FIG. 1 shows a typical PC with a bus hierarchy. Both a local bus 10 and an ISA expansion bus 11 are shown. A graphics controller 12 and monitor 13 reside on the local bus, along with an IDE hard drive controller 14 and hard disk 15. A fax modem 16 resides on the ISA expansion bus. The bus structure of FIG. 1 is hierarchical since the local bus is typically accessed first to utilize its speed. The ISA bus is addressed only after the addressed device is determined not to be on the local bus.

A number of manufacturers (e.g., Dell, NEC, Hewlett-Packard) have developed proprietary local bus systems, most of which integrate local bus video on the motherboard. But there are two emerging local bus standards: (1) the VESA local bus (or VL bus), developed by the Video Electronics Standards Association, and (2) the Peripheral Component Interconnect standard, developed by Intel as a high-end alternative to the VL bus. Both of these standards make available standardized slots into which one can plug high-speed local bus peripherals. FIG. 2 shows the bus architecture for a PC with a CPU host bus 21, both VL and PCI local busses (22 and 23, respectively), and an ISA expansion bus 24.

FIG. 2 also shows a CPU device 31, and a main memory device 32. The busses in FIG. 2 are hierarchical, and the VL bus 22 is deemed to have a higher priority than the PCI bus 23, which has a higher priority than the ISA bus 24. When an I/O cycle is started in FIG. 2, the I/O address is decoded by a subtractive decoding scheme; i.e., by placing it on each of the busses until a device responds. Following this hierarchical order, the bus cycle operation is initiated first on the VL bus, and the CPU waits for a response from that bus (in the VL-bus context, this response is the "local device" or "LDEV" signal). Such a signal indicates that the address corresponds to a device on the VL-bus, and upon receipt, a bus operation is carried out on the VL-bus. If, however, no VL-bus device responds after a number of clock cycles (typically three or four clock cycles), it is assumed that the addressed device is not connected to the VL-bus. No bus operation is carried out on the VL-bus in this situation, and the address is issued next to the PCI bus. If the address corresponds to a device on the PCI bus, the PCI bus responds with "device select" signal ("DEVSEL"). Again, however, if no device responds after a number of clock cycles, the address is then issued to the next bus in the hierarchical order (the ISA bus).

This subtractive decoding scheme for multiple or hierarchical bus structures is inefficient and slow because a number of dock cycles can be expended waiting for a response from each bus. Yet the higher throughput afforded by local bus architectures are necessary for today's software, and hierarchical bus architectures have become the microcomputing norm. What is needed, therefore, is a method or apparatus for reducing delays introduced by the slow decoding schemes used in today's computers, while still providing the functionality and utility of multiple and hierarchical bus architectures.

SUMMARY OF THE INVENTION

A computing system is claimed, comprising (1) a processor capable of generating an address, wherein the address corresponds to a peripheral device; (2) a plurality of busses including a target bus, wherein the peripheral device is connected to the target bus; (3) subtractive decoding logic for determining a bus association, wherein the bus association identifies the bus that corresponds to the address (the target bus); (4) a memory device for storing the bus association; and (5) bridge logic for retrieving the bus association from the storage means, and for accessing the target bus without first accessing any of the other busses:

A primary object of the present invention is to reduce the time required to access peripheral devices in a system that has multiple busses in a hierarchical bus structure.

BRIEF DESCRIPTION OF THE DRAWINGS

FIGS. 5, 8, and 9 are bus association data formats.

FIG. 6 is a representation of access device memory.

FIG. 7 is a PC-based implementation of the present invention.

FIG. 10 is a map of a 32-bit address space.

DETAILED DESCRIPTION

The present invention reduces the time required to access peripheral devices or to perform peripheral device operations in a system that has multiple busses in a hierarchical bus structure.

Figure 1:
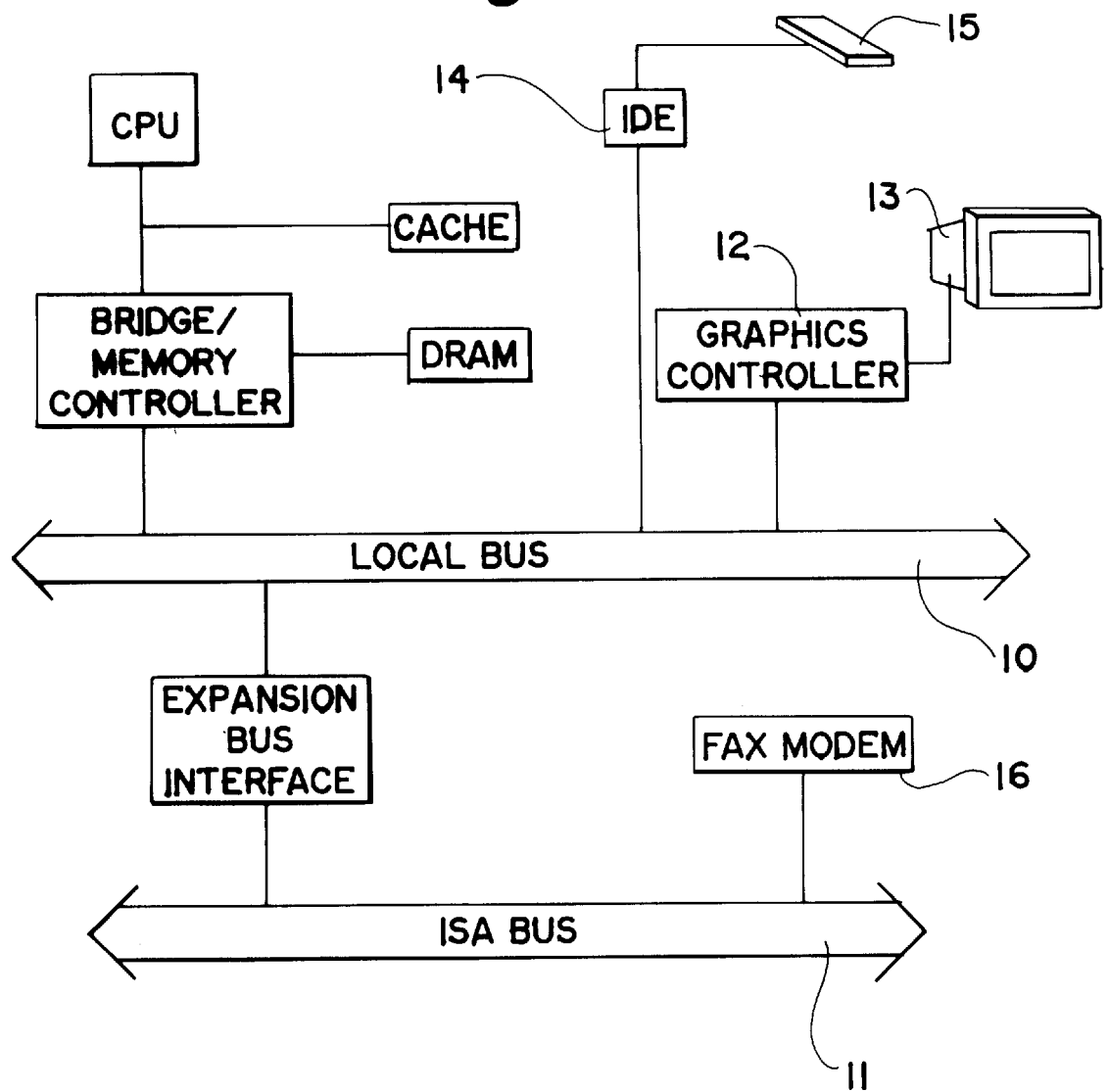
FIGS. 1, 2, and 3 are prior art systems.
Figure 2:
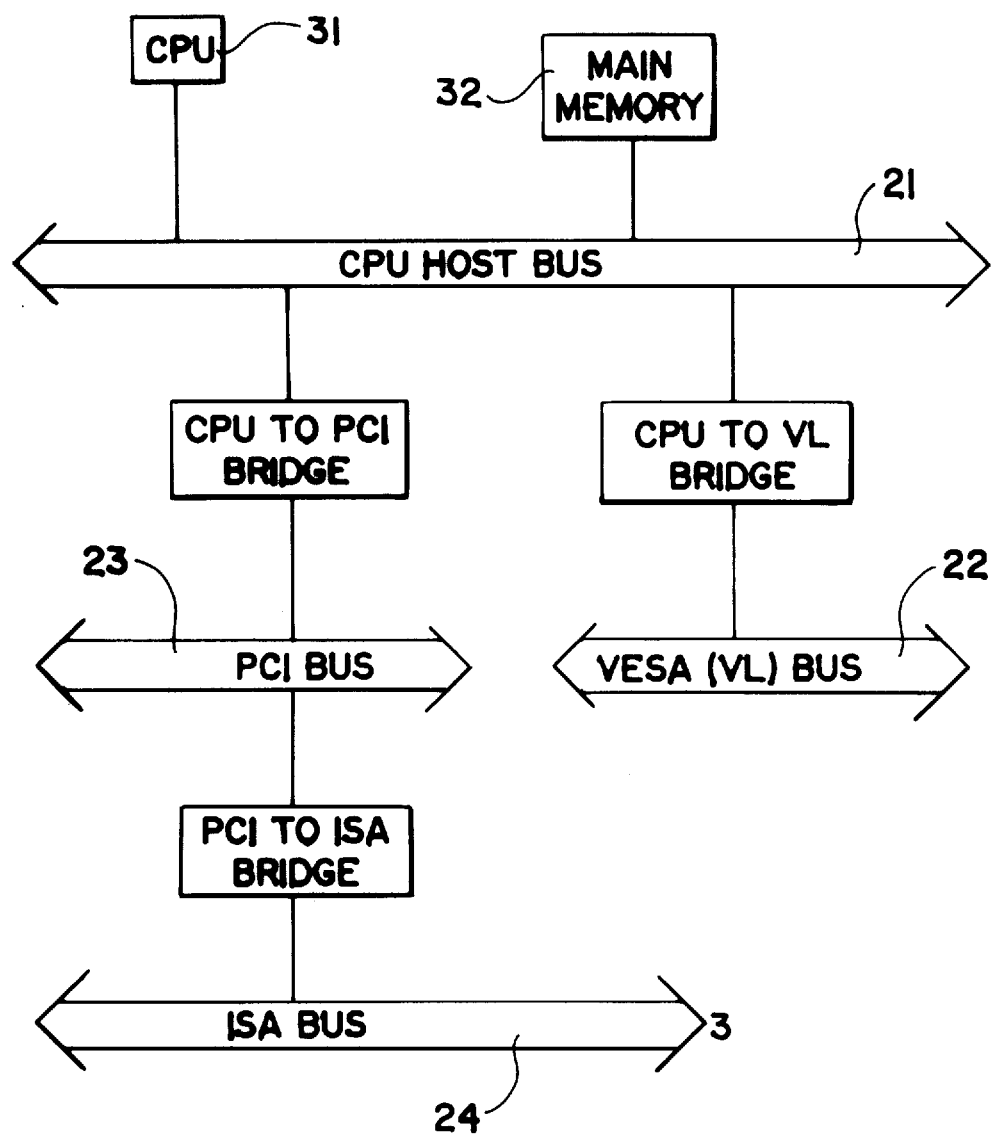
Figure 3:
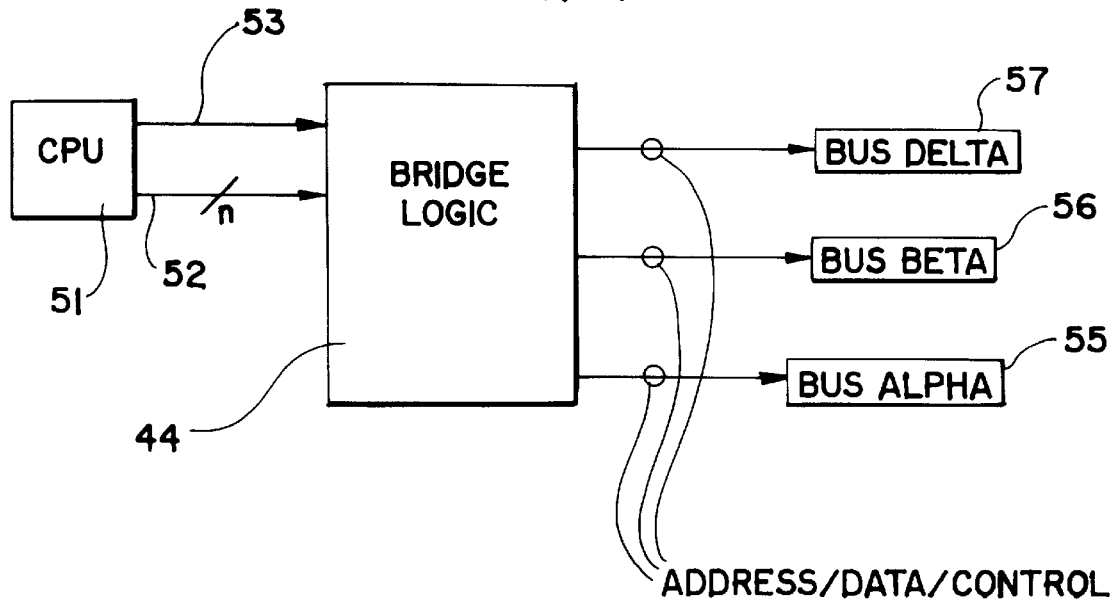
Figure 4:
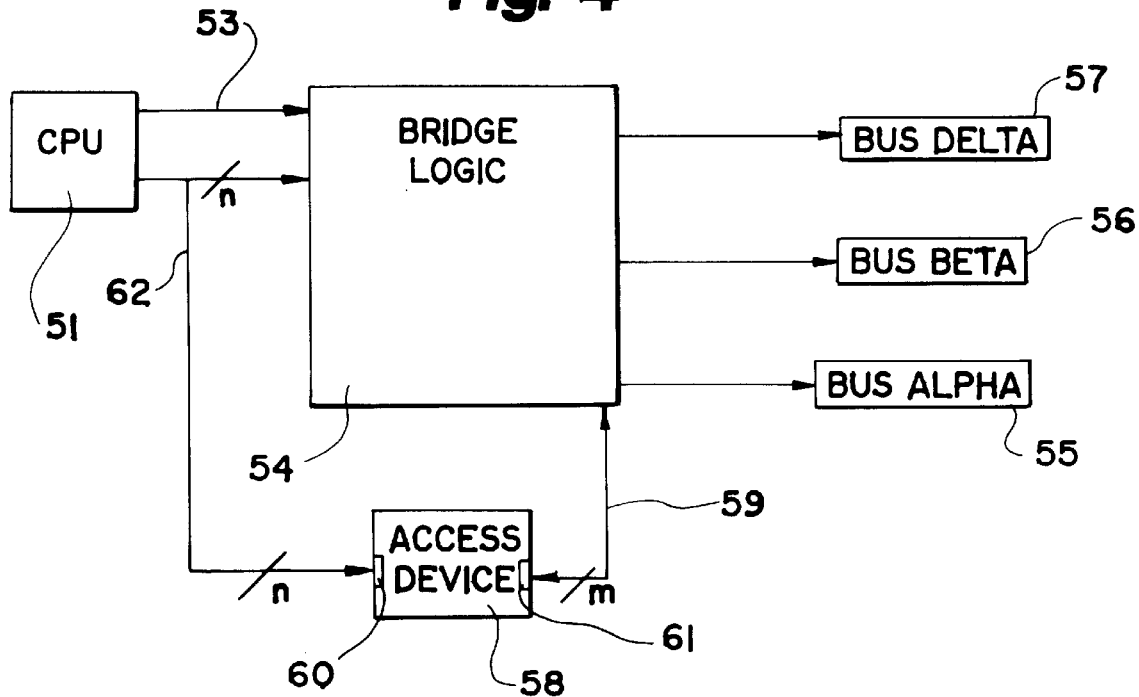
FIG. 4 is a general block diagram of a computing system with an access device.

FIGS. 3 and 4 are system block diagrams showing a CPU 51, bridge logic 44 and 54, and three busses 55, 56, and 57. The systems in both FIGS. 3 and 4 have hierarchical bus structures. Bus alpha 55 has the highest priority, bus beta 56 has the second highest priority, and bus delta 57 has the lowest priority.

In FIG. 3, when an I/O cycle is initiated, the I/O address is placed on the n-bit I/O address bus 52. The I/O address corresponds to a particular peripheral device on one of the busses 55, 56, 57. Exactly which bus the addressed peripheral device is connected to, however, is generally unknown. To determine the location of the peripheral device, a subtractive decoding operation is typically performed. The bus hierarchy dictates the order of the subtractive decode operation. In FIG. 3, therefore, the I/O cycle is first initiated on bus alpha 55. If a device responds on bus alpha, the I/O operation is carried out on that bus alpha device. If there is no response on bus alpha after some number of clock cycles, the I/O cycle is initiated on bus beta. If the addressed device is on bus beta, the I/O cycle is carried out on that bus. If there is no response on bus beta, the I/O cycle is finally initiated on bus delta, the lowest bus in the hierarchy.

FIG. 4 shows an embodiment of the present invention, and is an improvement over the prior art system of FIG. 3. Access device 58 is used to reduce the delays caused by the subtractive decoding scheme used in FIG. 3. When an I/O operation is initiated in FIG. 4, the I/O address is placed on the n-bit I/O address bus 62. The address is placed at the inputs of the bridge logic device 54, and the address is also placed at the inputs 60 of the access device 58. The access device responds to the address by placing bus association data at the outputs 61 of the access device 58. The bus association data is fed to the bridge logic 54 by the m lines 59.

The bus association data represents a bus association, i.e., a connection or relationship between a peripheral device and a bus. In one embodiment, the bus association can be simply an identification of a bus. For example, in such an embodiment the access device 58 can be implemented by a two-bit wide random access memory and controller. Each two-bit wide memory location would contain data that simply identifies one of the three busses (alpha, beta, and delta). When an I/O address is placed at the inputs 60 of the access device 58, the contents of memory (the bus association data) is placed at the output port 61. The contents of the two-bit memory location could be, in one embodiment, one of the four possibilities shown in FIG. 5. As can be seen, the data can be either valid or invalid. If valid, the bus association data will be one of the first three of the four two-bit possibilities, and will identify a particular bus in the bus hierarchy (alpha, beta, delta). This identified bus is called the target bus. The fourth possibility does not correspond to any of the busses; this fourth bit pattern corresponds to an "invalid" bus association.

The bridge logic device 54 in FIG. 4 responds to valid bus association data by initiating the I/O cycle on the target bus before initiating the cycle on the other busses, regardless of bus hierarchy. In other words, if the bus association data is "01," the I/O cycle is initiated first on the beta bus, even though alpha bus has a higher priority in the bus hierarchy. In a sense, the access device modifies the bus hierarchy. In most cases, this procedure can reduce the delays caused by the subtractive decoding used in the prior art because the target bus will very likely respond to the address. If, however, the target bus (in this example, the beta bus) does not respond, the conventional subtractive decoding procedure is then carried out, following the normal hierarchy. (In such a case additional logic could remove the target bus from the subtractive decode operation.) The decoding means for carrying out a decoding procedure, such as a subtractive decoding procedure, is integrated into the bridge logic device 54.

The bridge logic device 54 responds to invalid data by carrying out the conventional subtractive decode procedure, following the normal bus hierarchy. This involves first accessing the alpha bus, and if necessary, then the beta bus and finally the delta bus.

Figures 5, 6:
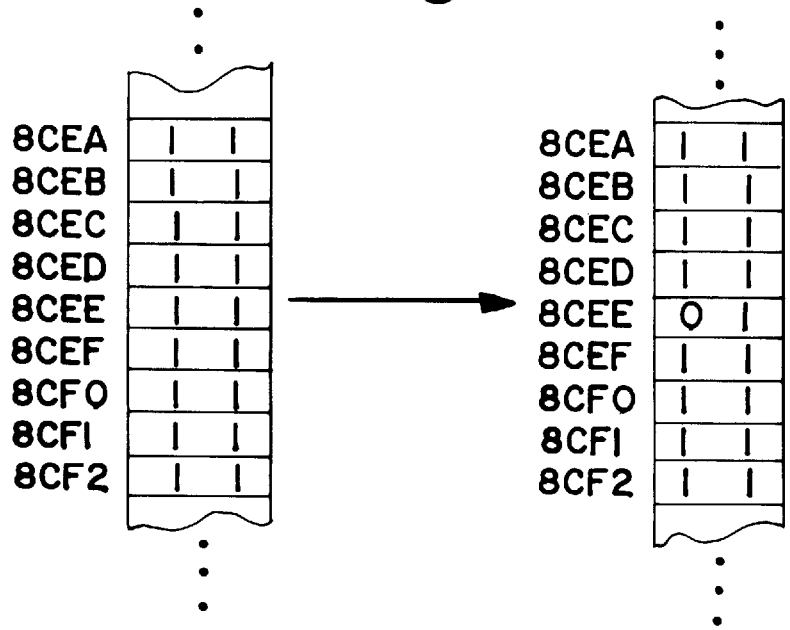

An important aspect of the present invention is how the bus association data is first generated and stored in the access device 58. In one embodiment, the contents of each access device memory location is initialized (e.g., at start-up) to invalid bus association data. As shown in FIG. 5, binary "11" is the invalid bus association data. Valid bus association data is therefore written to the access device 58 as it becomes available. For example, when an I/O cycle is initiated with I/O address 8CEE hex, the access device 58 will place invalid bus association data ("11") at the port 61. The bridge logic will respond to this bus association data by carrying out the normal subtractive decode operation. When the I/O address generates a response on one of the busses, the bus association is recorded by writing the appropriate bus association data (as defined in FIG. 5) to the access device memory contents. If the address 8CEE hex generates a response on bus beta, bus association data "01" is written to access device 58 memory address "8CEE" hex. When writing to the access device 58 in FIG. 5, the bus logic device writes the appropriate bus association data to the access device 58 at the address that is on address lines 62. The address can be held by the CPU on lines 62 while the bus logic device writes to the access device 58. Alternatively, the address can also be placed at the address inputs to the access device 58 by the bridge logic device (in a manner not shown). FIG. 6 shows the contents of the two-bit wide memory of access device 58, before the I/O cycle and after. The memory contents of the access device 58 are also updated when valid bus association data does not produce a response on the target bus. In such a situation, the appropriate memory location is changed to invalid bus association data.

In another embodiment, the contents of each access device 58 memory location is initialized by generating valid bus association data for a group of memory locations simultaneously. One way to implement such an embodiment of the invention would be to simply perform a subtractive decode procedure on some or all of the I/O addresses at system start-up. For each address that generates a response, the access device 58 memory contents would be updated accordingly.

The present invention can be illustrated by an example. Assume, for the purposes of this example, that each memory location in the access device is initialized (e.g., at system start-up or at system re-boot) to the "invalid" state "11." No attempt is made to generate valid bus association data at start-up. Consider the following three I/O operations in the context of FIGS. 4 and 5.

1. The CPU begins an I/O cycle with I/O address "9FA0" hex. The data at the address "9FA0" hex in the access device is "11" so the bus logic performs the normal subtractive decode operation. This involves placing the address first on the alpha bus and waiting for a response. If there is no response after a number of clock cycles, the address is placed on the beta bus. After more clock cycles, the address is finally placed on the delta bus if there's no response from the beta bus. The delays associated with this subtractive decoding scheme may become substantial. Assume that a device on the delta bus 57 responds to the 9FA0 hex address from the delta bus 57. The bus association data corresponding to the delta bus ("00") is written to the access device at address 9FA0 hex.

2. The CPU then begins an I/O cycle with I/O address "ABCD" hex. Again, the data in the access device is "11," so the bus logic again performs the subtractive decode operation, this time generating a response from the alpha bus. The "10" identifier is written to the access device 58 at address ABCD hex.

3. The CPU begins another I/O cycle with an I/O address "9FA0" hex. The data at the address 9FA0 hex in the access device is now "00," identifying the delta bus as the target bus. The bus logic therefore bypasses the alpha bus and the beta bus and accesses the delta bus before any other bus. The device with address 9FA0 hex will likely respond from the delta bus, but if no response is received after a number of clock cycles, the system falls back to the subtractive decode procedure. In such a case the 9FA0 hex address would be placed on the alpha bus, and if there's no response on the alpha bus, the address would be placed on the beta bus.

FIG. 7 shows another embodiment of the invention with a typical PC architecture including a host bus 33, a PCI bus 36, a VL bus 37, and an ISA bus 39. Access device 40 is tied to the host bus 33, and operates in conjunction with the PCI bridge 34, the VL bridge 35, and the ISA bridge 38. Access device 40 is capable of controlling bridge devices 34, 35, and 38. Also, the bridge devices can read from and write to the access device 40. The access device 40 of FIG. 7 operates in a manner similar to the access device of FIG. 4.

The bus hierarchy of FIG. 7 places the VL bus highest in the hierarchical structure; the PCI bus is the next highest, and the ISA bus is the lowest. When an I/O cycle is initiated, an I/O address is placed at the address inputs of the access device 40. The access device then determines whether the corresponding bus association data, stored in the access device 40, is valid or invalid. If valid, the access device 40 issues appropriate control signals to access first the target bus as identified by the bus association data. If invalid, the normal subtractive decode procedure is carried out. FIG. 8 shows one possible two-bit data format for the storage area 41 in access device 40. Using this scheme, bus association data "11" serves as the invalid bus association data.

FIG. 9 shows an alternate implementation of bus association format for the access device 40. In the format of FIG. 9, three bits are used, two bits identifying a bus, and a single validity bit. As those skilled in the art will recognize, there are many acceptable deviations from these two formats. The foregoing description has been described with respect to very simple bus associations, normally involving a simple identification of a bus. Bus associations need not be so simple, and indeed, can be much more complex. For example, in some circumstances devices may be on a different bus in different contexts. A complex bus association may involve a device being on the ISA bus at start-up and then on the PCI bus thereafter. A bus association data format could be devised to describe this relationship between the device and the busses in the system. Such a data format would be used in place of the simple two or three bit formats described in the foregoing description.

The present invention is useful not only for I/O addresses, but also for memory addresses. In the PC-based system of FIG. 7 it is possible that accessing main memory will generate a bus operation involving the PCI, VL or ISA bus. For example, main memory space, instead of I/O space, is often used by network cards for passing packets. But the network card itself will be on the PCI, VL, or ISA bus. Another example is memory space being used to store image information for video displays. FIG. 10 shows the entire 32-bit physical address space. As shown in FIG. 10, address space A0000 hex to BFFFF hex is used by PC-compatible systems for storing image information video displays. (For some systems, this 128K is only a portion of the storage area used for video images.) A memory address falling in this area will correspond to the video controller, which will be on the VL, the PCI or the ISA bus. Therefore, a memory address falling in this range will generate a bus access.

Figure 11:
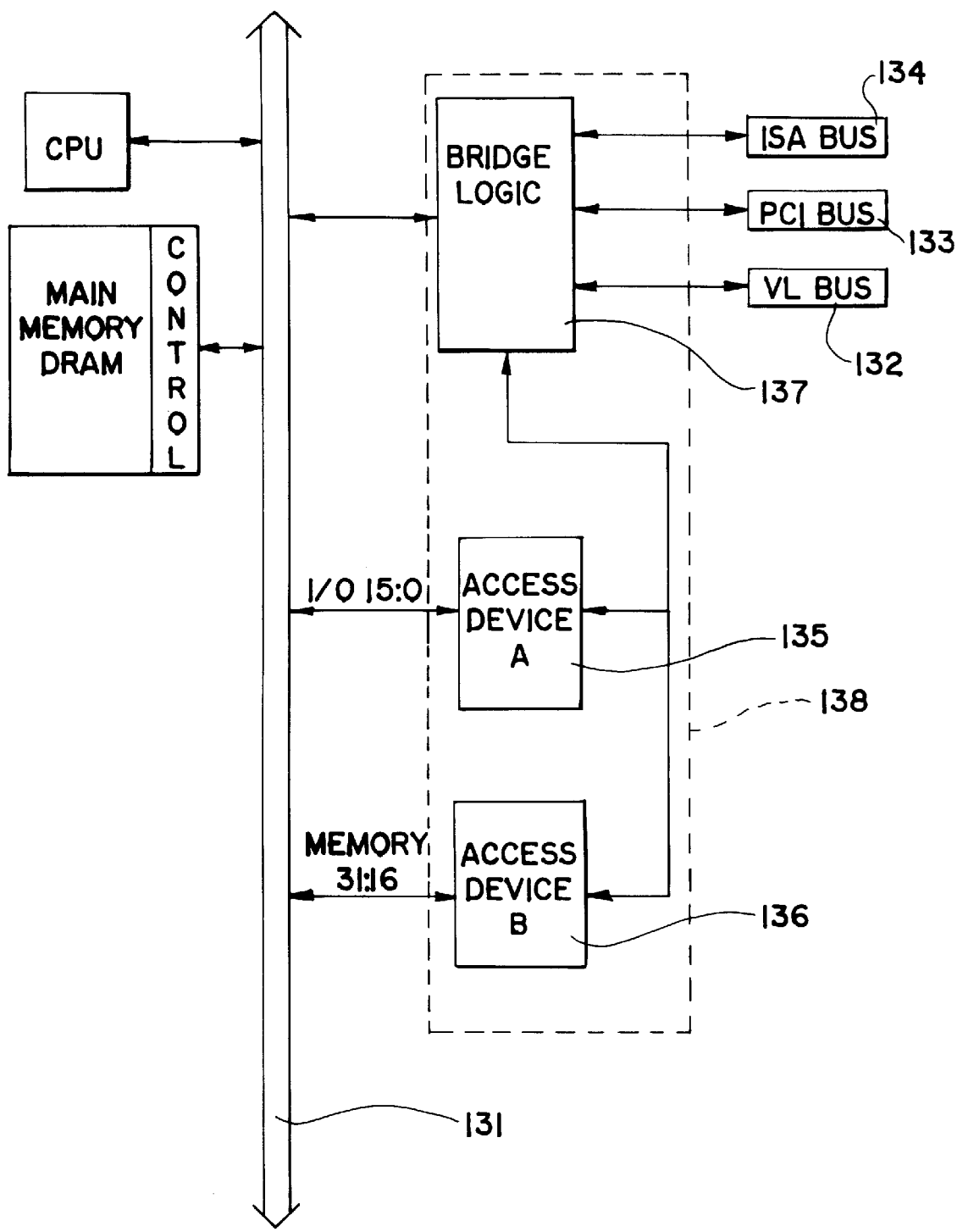
FIG. 11 is an alternate representation of a PC-based implementation of the present invention.

To illustrate this concept, FIG. 11 shows a PC architecture with the bridge logic 137 representing the bridge logic for the ISA, PCI, and VL busses. Shown are the host or CPU bus 131, the VL bus 132, the PCI bus 133, and the ISA bus 134. Access device A 135 receives all 16 of the I/O address lines, and access device B136 receives only the high-order 16 memory address lines of the available 32 address lines for a 386 or higher processor. Access device A works in a manner described previously for I/O addresses, and access device B works in a similar manner, but it considers memory, rather than I/O addresses. As discussed, memory addresses 000A0000 hex to 000BFFFF hex implicate the system's video controller, and will result in an access to the VL, PCI or ISA bus. Like other peripheral devices, however, exactly which bus the video controller is connected to is not generally known. Therefore, access device B can be used to store bus association data that describes the relationship between memory addresses and the PCI, VL and ISA busses. Only the high order 16 bits of the memory addresses need to be fed to Access device B, since video memory falls on 64K boundaries. The lower-order 16 bits are irrelevant for decoding purposes.

The I/O space for a 386/486 PC is only 64K in size. A 64K device can be used for the I/O address access device, and each I/O address will be represented in the access device. For memory addresses, an access device that has a memory location for each memory address is not practical because this would require 4 gigabytes of address space to be represented for a 32-bit address space. Instead, a smaller device can be used to represent regions of memory. A 64K device, for example, will allow each 64K region of memory address space to be represented. As long as the memory areas that generate bus operations are aligned along 64K boundries in address space, a simple 64K device will be effective for memory addresses. As shown in FIG. 10, the video area 201 is a 128K area that falls between 64K boundaries A0000 hex and C0000 hex. Therefore, a 64K device as described will work well as a memory address access device.

For convenience, the present invention has been described by referring to embodiments showing access devices that are not integrated into bridge logic or other hardware. Such an implementation is not necessary, however, and integrated access means can be designed that implements the present invention. Referring to FIG. 11, devices 135, 136, and 137 can be integrated into a single access means 138.

The present invention has also been described with regard to PC systems with busses based on differing architectures. This, however, need not be the case. For example, a bus based on PCI architecture can be used to feed into another PCI bus. In such a case, only one bus architecture is used, so the system cannot be described as having multiple bus architectures. Yet the present invention is applicable to this system because such a system has a hierarchical bus structure.

Although the present invention has been shown and described with respect to preferred embodiments, various changes and modifications that are obvious to a person skilled in the art to which the invention pertains are deemed to lie within the spirit and scope of the invention as defined by the following claims.

What is claimed is:

1. A method of accessing a peripheral device that is connected to a hierarchical bus structure, wherein the hierarchical bus structure comprises a plurality of busses, each having a position in a hierarchy, and wherein a bus cycle operation can be initiated on only one of the busses at a time, the method comprising the steps of:

finding a target bus through a decoding procedure that does not require an initial message, wherein the target bus is the bus on which the peripheral device is located;

storing bus association data in an access device, wherein the bus association data identifies the target bus;

reading the bus association data from the access device by placing an address at inputs to the access device;

accessing the target bus first without regard to the hierarchy if the bus association data is valid;

accessing the plurality of busses according to the hierarchy if the bus association data is valid but no peripheral device on the target bus responds; and accessing the plurality of busses according to the hierarchy if the bus association data is invalid.

2. A computer comprising:

a processor;

a plurality of busses, each of which can be accessed by the processor, wherein the busses have a hierarchical order, and wherein the processor can initiate a bus cycle operation on only one of the busses at a time;

an access device for storing information that identifies on which bus a peripheral device is located; and bridge logic that receives a first address from the processor and determines on which bus the device is located by initiating a bus cycle operation on the highest bus in the bus hierarchy and traversing through the bus hierarchy one bus at a time to eventually access the peripheral device, and then receives a second address from the processor, and accesses the peripheral device on the bus that corresponds to the address, without first initiating a bus cycle operation on busses that are farther up in the hierarchical order of the busses, wherein the bridge logic accesses the peripheral device more quickly upon receiving the second address than upon receiving the first address by an amount of time sufficient to access one of the busses in the hierarchy.

3. The computer of claim 2, wherein the information stored in the access device indicates whether a bus association for an address is valid.

4. The computer of claim 3, wherein the access device accepts i/o addresses as inputs, and wherein the computer further comprises:

a second access device that accepts memory addresses as inputs.

5. The computer of claim 2, wherein the second access device determines the bus that corresponds to the second address by considering only a portion of the second address.

6. The computer of claim 2, wherein the access device accepts i/o addresses as inputs, and wherein the computer further comprises:

a second access device that accepts memory addresses as inputs.

7. The computer of claim 2, wherein the access device determines the bus that corresponds to an address by considering only a portion of the address.

8. A method of accessing a device in a hierarchical bus structure comprising a plurality of busses, the method comprising the steps of:

first accessing the device by (1) placing an address corresponding to the device on a plurality of busses by traversing through the bus hierarchy one bus at a time, (2) determining on which of the busses the device is located by waiting for a signal from the device, and (3) storing data in an access device that identifies on which bus the device is located; and subsequently accessing the device by (1) reading the data stored in the access device by placing an address at inputs to the access device, (2) determining which bus is identified by the data, and (3) placing the address on the bus identified by the data without first placing the address on busses higher up in the bus hierarchy;

wherein the step of first accessing the device is carried out more slowly than the step of subsequently accessing the device by an amount of time sufficient to access one of the busses in the hierarchy.

9. The method of claim 8, wherein the step of determining which bus is identified by the data is carried out by considering only a portion of the address.

10. The method of claim 8, wherein the step of determining which bus is identified by the data requires that the data first be evaluated to ensure that it is valid.

* * * * *